United States Patent
Gurumurthy et al.

(10) Patent No.: US 9,471,474 B2
(45) Date of Patent: Oct. 18, 2016

(54) CLOUD DEPLOYMENT INFRASTRUCTURE VALIDATION ENGINE

(71) Applicant: Microsoft Corporation, Redmond, WA (US)

(72) Inventors: Kaushik Gurumurthy, Bothell, WA (US); Guruswamy Namasivayam, Renton, WA (US); Sunil Kutty, Redmond, WA (US); Michael G. Tricker, Redmond, WA (US); Angel Sarmento Calvo, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 19 days.

(21) Appl. No.: 13/970,531

(22) Filed: Aug. 19, 2013

(65) Prior Publication Data
US 2015/0052402 A1 Feb. 19, 2015

(51) Int. Cl.
G06F 11/00 (2006.01)
G06F 11/36 (2006.01)
G06F 11/07 (2006.01)
H04L 12/24 (2006.01)

(52) U.S. Cl.
CPC ....... *G06F 11/3688* (2013.01); *G06F 11/0709* (2013.01); *G06F 11/079* (2013.01); *G06F 11/0793* (2013.01); *H04L 41/0645* (2013.01)

(58) Field of Classification Search
CPC ............. G06F 11/0709; G06F 11/079; G06F 11/0793; G06F 11/3688
See application file for complete search history.

(56) References Cited

U.S. PATENT DOCUMENTS

| | | | | |
|---|---|---|---|---|
| 8,843,935 B2 * | 9/2014 | Hegdal et al. | | 718/104 |
| 8,914,499 B2 * | 12/2014 | Houlihan et al. | | 709/224 |
| 2003/0212928 A1 * | 11/2003 | Srivastava | | G06F 11/0709 714/47.3 |
| 2004/0049565 A1 * | 3/2004 | Keller | | G06F 11/079 709/223 |
| 2005/0015668 A1 * | 1/2005 | Doyle | | G06F 11/079 714/25 |
| 2005/0091640 A1 * | 4/2005 | McCollum | | G06F 11/0709 717/117 |
| 2005/0132253 A1 * | 6/2005 | Gail | | G06F 11/0709 714/25 |
| 2005/0198556 A1 * | 9/2005 | Tripp | | G06F 11/079 714/726 |

(Continued)

FOREIGN PATENT DOCUMENTS

EP 1515234 A2 3/2005

OTHER PUBLICATIONS

Oracle, "Additional Setup for Real-time Monitoring," retrieved from: http://docs.oracle.com/cd/E24628_01/em.121/e27046/install_realtime_ccc.htm on Jun. 6, 2013 (26 pages).

(Continued)

*Primary Examiner* — Michael Maskulinski
(74) *Attorney, Agent, or Firm* — Ben Tabor; Kate Drakos; Micky Minhas

(57) ABSTRACT

Embodiments of the invention provide a set of validators that can be used to determine whether an installation is operating within desired parameters and is in compliance with any requirements. The validators may be provided with a software application or release, for example, and may be run during and/or after installation to test the application operation. A set of self-healing operations may be triggered when faults are detected by the validators. This allows a software application to auto-diagnose and auto-self-heal any detected faults.

20 Claims, 4 Drawing Sheets

(56) References Cited

U.S. PATENT DOCUMENTS

| | | | |
|---|---|---|---|
| 2006/0010337 A1* | 1/2006 | Suzuki | G06F 11/079 714/4.1 |
| 2008/0016115 A1* | 1/2008 | Bahl | H04L 41/22 |
| 2009/0094484 A1 | 4/2009 | Son et al. | |
| 2010/0223499 A1 | 9/2010 | Panigrahy et al. | |
| 2011/0264953 A1* | 10/2011 | Gawor | G06F 11/0793 714/15 |
| 2012/0042040 A1 | 2/2012 | Bailey et al. | |
| 2012/0096527 A1 | 4/2012 | Pasternak | |
| 2012/0159517 A1 | 6/2012 | Shen et al. | |
| 2013/0097304 A1 | 4/2013 | Asthana et al. | |
| 2013/0247136 A1* | 9/2013 | Chieu et al. | 726/1 |
| 2014/0006844 A1* | 1/2014 | Alderman et al. | 714/4.1 |
| 2014/0096129 A1* | 4/2014 | Kimmet | G06F 8/61 717/177 |
| 2014/0122935 A1* | 5/2014 | Li et al. | 714/38.1 |
| 2014/0310564 A1* | 10/2014 | Mallige | G06F 11/0793 714/47.1 |
| 2014/0372805 A1* | 12/2014 | Rijnders | G06F 11/0793 714/37 |

OTHER PUBLICATIONS

JIT2600, "Self Healing in Service Provider Cloud—Your Thought?," Blog entry, retrieved from: http://stretch-cloud.info/2013/03/self-healing-in-service-provider-cloud-your-thought/ on Jun. 6, 2013, published Mar. 26, 2013, (4 pages).

Narayanaswamy, Anand, "Windows Azure SDK 2.0 Adds New PowerShell cmdlets with Enhancements for Storage and Service Bus," retrieved from: http://www.infoq.com/news/2013/05/windows-azure-sdk-2-net on Jun. 6, 2013, published on: May 20, 2013, (12 pages).

Kumar,Shruthi et al., "Easy, Real-Time Big Data Analysis Using Storm," retrieved from: http://www.drdobbs.com/open-source/easy-real-time-big-data-analysis-using-s/240143874?pgno=1 on Jun. 6, 2013, published on: Dec. 4, 2012, (5 pages).

"International Search Report and Written Opinion Issued in PCT Application No. PCT/US2014/051398", Mailed Date: Feb. 4, 2015, 10 Pages.

* cited by examiner

CLOUD DEPLOYMENT INFRASTRUCTURE VALIDATION ENGINE

BACKGROUND

As the number of datacenter devices increases, the deployment of hardware and software for cloud infrastructure and services becomes more complicated. When operating systems and software components will be installed and configured across many physical and virtual machines, it can be very difficult for a datacenter operator to detect when one or more of many components fails, identify which components have failed, and analyze the failure to determine the appropriate resolution.

Typically, existing datacenter components expose multiple error-detection mechanisms that are not tied together and that do not work well across multiple servers or operating system instances. As a result, in current configurations, it is up to the operator to manually correlate and interpret error logs and events on multiple systems and/or devices to diagnose failures. This can be especially difficult to identify the source of timing-dependent or transient issues, such as temporary network glitches, security intrusions, deployment failures etc., across a large number of datacenter devices and distributed services. When a datacenter service provider configures their cloud service, it can take multiple days or weeks to install the service successfully.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A cloud deployment infrastructure validation engine allows a datacenter or cloud service to be installed quickly by automating install validation and failure diagnostics. Additionally, the validation engine may be used to verify disaster recovery and backup operations by deliberate fault injection and observation of failover operation.

The cloud deployment infrastructure validation engine provides a generic pluggable, flexible, and extensible framework to author and execute state validators, diagnostics, and remedial actions. The cloud deployment infrastructure validators consume data from installation log files, and real-time events during installation, configuration, and operations. The validators query components and correlate events to determine current execution status, connectivity, error conditions, system intrusions, or compliance issues. If a validator fails a pre-determined condition, then a diagnostic may be automatically invoked to diagnose and potentially self-heal the system or to provide the operator with guidance for resolution.

Embodiments of the invention provide a set of validators that can be used to determine whether an installation is operating within desired parameters and is in compliance with any requirements. The validators may be provided with a software application or release, for example, and may be run during and/or after installation to test the application operation. A set of self-healing operations may be triggered when faults are detected by the validators. This allows a software application to auto-diagnose and auto-self-heal any detected faults.

The validators consume a map that links servers with roles and that identifies which role a specific validator is meant to validate. For example, SQL Server® roles may be mapped to physical machines and the validator may validate the successful configuration of a highly available SQL Server® cluster spanning multiple server nodes.

A single role may require multiple validators. A manifest is used to describe dependencies between the validators. When validating a single role, the test manager knows which validators to invoke and what dependencies exist between them (e.g., only invoke validator B if validator A succeeds, whereas validators C, D, and E can all run in parallel with no cross dependencies between them). The role manifest also describes which logs need to be aggregated via a log aggregator.

When a validator returns an error or warning, a test manager may have a dependency in place associating a diagnoser with a specific validator. The diagnoser can parse the aggregated log files associated with the server role being validated (e.g., SQL Server® installation log files, event logs for the various server nodes in a cluster, etc.). The diagnoser may search for well-known setup error strings or specific events as well as use the timestamps in event logs to determine dependencies between errors (e.g., setup failed on node X, triggering a cross-cluster event that arose on nodes Y and Z).

In some cases, the diagnoser may be able to invoke a resolver (e.g., self-healing via the retry of a specific operation, forcing the update of a specific network setting, etc.) after which the original validator will be re-invoked to confirm that the solution provided actually solved the problem. In cases where self-healing is not possible, the diagnoser may provide a pointer to on-line help documentation, solutions for specific error codes, or FAQ-like solutions (e.g., "in cases where X occurs, try doing Y").

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
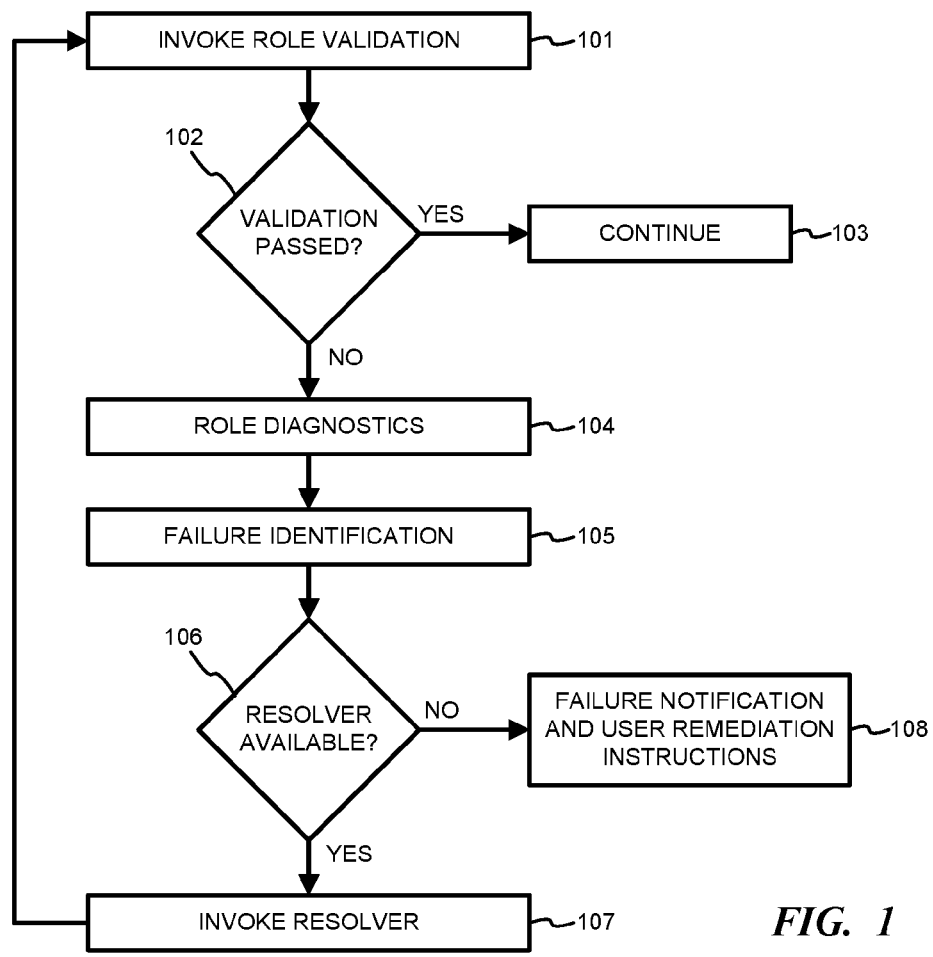
FIG. 1 is a flow chart illustrating a cloud deployment infrastructure validation engine process according to one embodiment.

An extensible framework delivering plug-in validators, diagnosers, and resolvers that can be run across multiple physical and virtual instances of datacenter devices (e.g., server hardware, network switches etc.) and operating systems to help find, diagnose and resolve problems with installation, configuration and operation of cloud infrastructure and services.

The validators may be released with a product or software application, for example. The validators ensure that the application is running correctly and alert the operator when a failure is detected. The validators may be run automatically by the application or may be triggered by the operator. The validators be used to verify operation at a specific time, or they may run in the background occasionally "waking up" to test the application. Upon detection of a failure, the validators may trigger additional validators to identify the source and/or extent of a failure. The validators may attempt to self-heal the failure by reconfiguring or reinstalling code. Alternatively, the validators may provide intelligent instructions to the operator, such as providing a list of steps to perform to fix a problem or identifying additional information sources (e.g., web pages, text files, FAQs, install documentation, etc.) that describe the problem and potential solutions.

The cloud deployment infrastructure validation engine is a highly distributed and integrated to provide topology-aware, cross-system validation (i.e., across different servers, virtual machines, and racks), virtual instances, and other datacenter devices. Using automated timeouts and re-tries, the cloud deployment infrastructure validation engine is able to run each individual validator until completion (i.e., success or failure) is reported.

The cloud deployment infrastructure validation engine allows for hierarchical execution to manage both dependencies between components and the parallel execution of multiple independent code paths. The cloud deployment infrastructure validation engine consumes real-time events and modifies its behavior based on multiple inputs.

Upon detection of a failure, the cloud deployment infrastructure validation engine enables self-healing of the configuration, for example, by triggering resolvers or dynamic network re-configuration or by providing instructions and information to the operator.

The cloud deployment infrastructure validation engine may be integrated with desired state configuration using pre- and post-conditions to ensure successful completion of an installation. Additionally, the cloud deployment infrastructure validation engine supports event (e.g., fault) injection to exercise recovery of a fully configured solution.

The validators, diagnosers, and resolvers may be written in an XML script, Windows PowerShell®, Visual Basic®, C#, or any .NET supported language. The validator may be a script, software application, or code that identifies operations or tests that may be used to validate the operation of a role or software application on a physical or virtual machine, server, or device. The diagnoser may be a script, software application, or code that identifies diagnostics, operations, or tests that may be used to identify the source of a problem when the validator indicates a failure. The resolver may be a script, software application, or code that identifies potential solutions for the problem identified by the diagnoser.

FIG. 1 is a flow chart illustrating a cloud deployment infrastructure validation engine process according to one embodiment. In step 101, a role validation process is invoked. The success or failure of the role validation is analyzed in step 102. If the validation passes step 102, then the datacenter operation may continue in step 103, such as deploying additional services and configuring additional machines. If the validation process fails step 102, then the cloud deployment infrastructure validation engine initiates role diagnostics in step 104 to analyze the role configuration and deployment.

In step 105, the cloud deployment infrastructure validation engine identifies the failure(s) that are preventing role validation. In step 106, the cloud deployment infrastructure validation engine determines whether it has a resolver available for the failure identified in step 105. If a resolver is available, then the cloud deployment infrastructure validation engine invokes the resolver at step 107. When a resolver is not available, the cloud deployment infrastructure validation engine may provide a failure notification and other information, such as user remediation instructions, to the operator in step 108. After the resolver has applied the designated correction, the process returns to step 101 where the validator runs again to validate the role.

Figure 2:
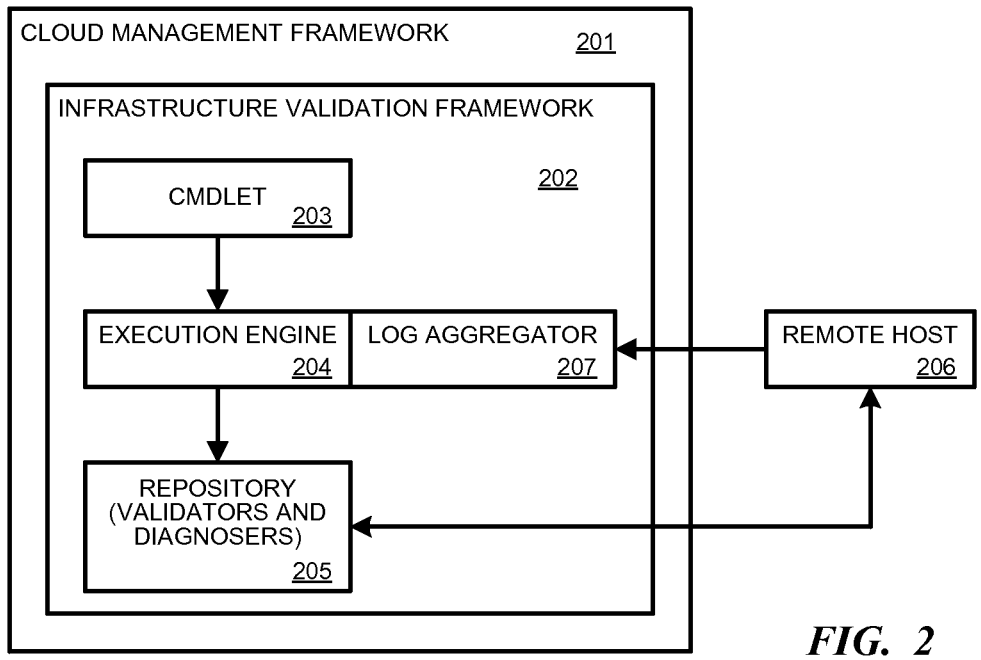
FIG. 2 is a block diagram of a cloud management framework supporting a cloud deployment infrastructure validation framework.

FIG. 2 is a block diagram of a cloud management framework 201 having cloud deployment infrastructure validation framework 202. Cloud management framework 201 constitutes software that manages the servers, machines, and fabric in the datacenter. Cloud deployment infrastructure validation framework 202 is based on a set of pluggable components including a command (cmdlet) interface layer 203, execution engine 204, log aggregator 205, and repository layer 206. The cloud deployment infrastructure validation framework 202 interfaces with external components of the cloud management framework 201 through cmdlet layer 203.

Cloud management framework 201 calls into commands in cmdlet layer 203, which is the entry point into the validation framework 202. Cmdlet interface layer 203 provides validators and diagnostics to consumers, such as a datacenter operator or hoster. Cmdlets consume server maps, which describe the servers that are associated with specific server roles, and credentials to manage access, and output a test status including error/warning states and a list of log files.

The cmdlets talk to the execution engine 204, which is capable of querying a set of validators and diagnosers in repository 205. Execution engine 204 creates a dependency graph among the validators and passes the graph on to a test manager that schedules the individual validators. The test manager uses timeouts and potentially re-schedules the validators if they do not execute in the allotted time. A cmdlet executor manages a runspace pool that is used to execute the cmdlet scripts comprising or called by validators and diagnostics.

The validators and diagnosers may be a list, group, or other collection of scripts that are self-describing and are associated with particular roles in the datacenter. For example, one group of validators may be associated with a System Center Operations Manager (SCOM) role in the datacenter. That group of validators is relevant to checking for success or failure and diagnosing and healing any failures for the SCOM role. The validators may be loaded when the role is created and then operate in the background to ensure that the role was properly installed and is operating correctly.

The validators or diagnosers may look for particular error codes or other warnings to identify potential problems with a particular role. The validators and diagnosers may look for specific sequences of error codes and then associate such sequences with particular underlying failures. The failures may occur on the same or different nodes or devices, such as different physical machines, virtual machines, switches, etc.

The validators and diagnosers in repository 205 may have hierarchical dependencies. The execution engine 204 may query the validators and diagnosers and build a tree of dependencies among the validators and diagnosers. The execution engine 204 may also map the hardware target associated with the validators and diagnosers. The validation engine may map hardware in the datacenter to specific roles and then identify validators that need to be run on each of those roles.

The operator may use cmdlets to request validation of a particular role. For example, a cmdlet for a monitoring role may be used to validate whether the monitoring role is operating properly. The validation engine will identify which remote host 206 or hardware target is running the monitoring role and will execute the appropriate monitoring role validators on that hardware target 206.

The validators cause logs to be written including, for example, logs that are written by the validator itself and logs from other sources that might be relevant to the validator. When a validator is testing a component, the component may have its own logs with potentially relevant information. As part of its manifest, the validator may tell the validation framework to collect these logs as part of the validator execution. The log aggregator 207 collects the logs written by, or identified by, the validators. The repository 205 is responsible for serializing the results of validation operations and is used by log aggregator 207 to find where logs will be copied from and to for use by diagnosers.

Log aggregator 207 layer copies logs from remote servers so that diagnosers can parse them for error conditions and can interpret dependencies between errors on different machines (e.g., in the case of a cascading error triggered on one server but affecting others). The logs may be used for deep diagnostics and post-mortem analysis. For example, a component manufacturer may analyze error codes, strings, combinations of strings, etc. to identify the source of the problem.

Figure 3:
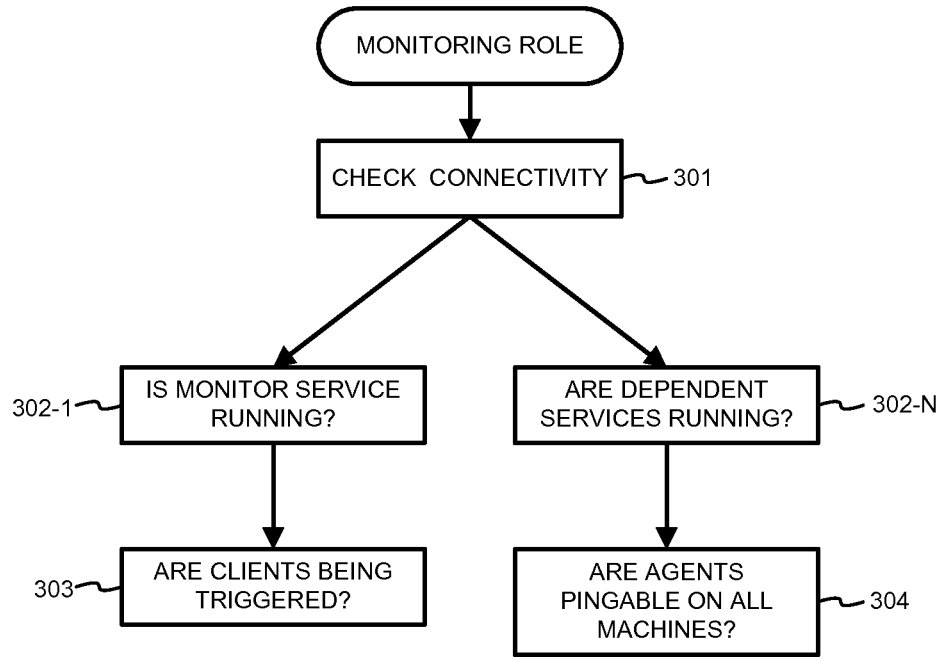
FIG. 3 is a flowchart illustrating a hierarchy of validators used for validating a monitoring role in one embodiment.

FIG. 3 is a flowchart illustrating a hierarchy of validators used for validating a monitoring role in one embodiment. When validating the monitoring role, validator 301 is run first to check connectivity. Connectivity validator 301 tests whether or not the validation engine can connect to the targets that are running a monitoring role. If the check connectivity validator 301 fails, then additional validators may be triggered. For example, validator 302 determines whether the monitoring service is running. Additional validator 303 may also run and determine whether dependent services are running. After the first validator 301 fails, an arbitrary number of dependent validators 302-1 to 302-N may be triggered sequentially or in parallel to drill down further into a connection problem and to identify the source of the connectivity failure. Validators 302-1 to 302-N may run on a number of different devices, virtual machines, and servers, for example, to perform additional checks.

If validators 302 pass, then additional validators 303, 304 may be triggered to run. The source of the overall connectivity problem may be identified once one of the dependent validators fails. At that point, at least one problem has been identified and a diagnoser associated with the failed validator may be triggered. Based on the results of the validators (e.g., validators 302-1 and 302-N passed, but validator 303 failed), the diagnoser may identify a potential source of the problem. The management framework may attempt to autoheal the problem or the diagnoser may provide information for the operator to solve the problem.

The hierarchy of dependencies allows the validators to start with course checks and proceed with more and more fine-grained checks to find the source of the problem.

The validators comprise a manifest of the desired state of the associated component. The execution engine executes the manifest until it encounters an error. The execution engine can then identify step of the manifest workflow that triggered the error. The error can then trigger a self-healing action, which may be automatic or manual. Dependencies between validators may be described within a single manifest that spans multiple validators, diagnosers, and/or resolvers.

Figure 4:
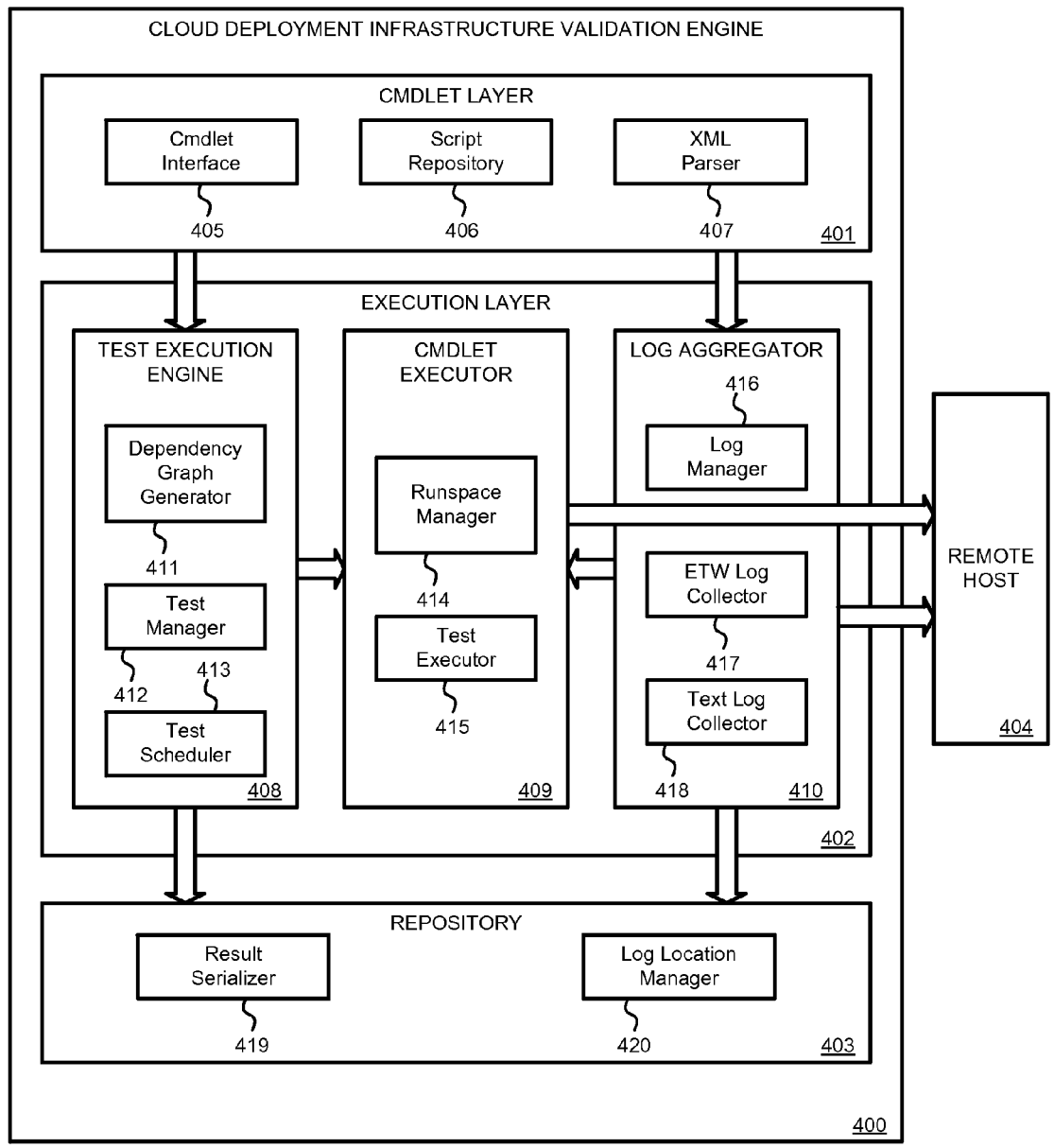
FIG. 4 is a block diagram of internal component organization for a cloud deployment infrastructure validation engine according to one embodiment.

FIG. 4 is a block diagram of internal component organization for a cloud deployment infrastructure validation engine 400 according to one embodiment. The cloud deployment infrastructure validation engine 400 comprises cmdlet layer 401, execution layer 402, and repository 403. The cloud deployment infrastructure validation engine 400 is used in one embodiment to validate components on a remote host 404, which may be a server, virtual machine, switch, or other device. If a failure is detected, then the cloud deployment infrastructure validation engine 400 may attempt to diagnose the source of the failure and to repair the problem, if possible.

Cmdlet layer 401 comprises a cmdlet interface 405, script repository 406, and XML parser 407. The cmdlet layer 401 primary duty is to provide an interface so that the validation engine 400 may be invoked by an operator or a cloud management framework. Cmdlet interface 405 is adapted to receive commands that activate validators for particular roles. In one embodiment, the cmdlets may be written for Windows PowerShell®, Visual Basic®, C#, or any .NET supported language.

Each validator is written in a particular format as an XML manifest that identifies the parameters required by the validator and specifies the validator hierarchy where appropriate. One or more validation functions are specified in the XML manifest. The XML manifest also identifies the logs to collect. The XML manifests are stored in script repository 406. Diagnosers and self-healing files may also be written as XML manifests and stored in script repository 406.

XML parser 407 understands how to read the XML scripts stored in repository 406 and to provide any necessary information extracted from the scripts to the execution engine 408 in execution layer 402.

Execution layer 402 comprises test execution engine 408, cmdlet executor 409, and log aggregator 410. Dependency graph generator 411 in execution engine 408 receives information from XML parser 407 and generates a map of the validator dependencies, which represents how the validators are related to each other. Test manager 412 maintains dependency mapping between the validators and keeps track of where the script for each validator can be found in script repository 406. Test manager also tracks which validators are associated with a particular role so that only relevant validators are run for each role. Test scheduler 413 controls where each validator is to be run for a particular role, such as running the validator on a datacenter management server or on a remote host. Test scheduler 413 also tracks where each role that is to be validated is operating, which may be on multiple physical and/or virtual machines.

Cmdlet executor 409 comprises runspace manager 414 and test executor 415. Cmdlet executor 409 is responsible for actually executing the validator. Test manager 412 and test scheduler 413 use the cmdlet executor 409 to run the validation test on a target device. Runspace manger 414 manages connections to remote host 404 and provides a runspace for test executor 415 to run a specific validator on the remote host. Cmdlet executor 409 handles errors, such as validator failures, and allows information to flow between validators and diagnosers. This provides status information, such as which failures have been observed, which validators have been run, what components are running, etc., to the diagnoser so that the diagnoser can identify the source of a failure.

The validator does not have to run immediately or just one time. Instead, the validator may wait for a service to start before validating the service. Additionally, if the validator cannot validate the service, it may retry multiple times until it times out. This allows the execution layer 402 to call the validator before the service has begun. The validator will then wait for the service to start and will attempt validation at that time. For example, the validator may periodically "wake-up" and run its checks if the service is available or "sleep" for an additional period if the service is not yet running. The validator will continue attempting to validate the service until a timeout period expires at which time the validator will shut down. The test executor 415 may then restart the validator after the timeout period.

Once the validation test has been run on a target device, the execution layer 402 collects logs using log aggregator 410. Log manager 416 tracks which logs to collect for a particular validator and where to store the logs. Log manager 416 uses specific collectors for different types of logs. For example, ETW log collector 417 may be used to collect logs for Microsoft Windows® using the Event Tracing for Windows (ETW) mechanism to trace and log software events. Text log collector 418 is used to collect text files, such as a plain text log, for example. Additional log collectors may be created for proprietary or other log types that are used by the validators.

The runspace manager 414 and log aggregator 410 communicate with the remote host 404 to either run validator tests or to extract logs. The cloud deployment infrastructure engine may use identifiers or other controls to limit where each validator can be run. This would prevent validators from running in unapproved areas of the infrastructure, such as limiting validators to role-specific areas.

Repository layer 403 is a storage layer that assists execution layer 402 by retrieving and storing the test results from the remote host 404 and test targets. Result serializer 419 processes the test results and saves them in an appropriate format. For example, result serializer 419 collects success and failure information from the validators and saves the information in a persistent format that can be stored and accessed by the operator, a device manufacturer, other validators and diagnosers, etc. Log location manager 420 provides addressing capability so that the serialized data can be stored and retrieved from a central location. The log location manager 420 may further track which logs came from which remote host and/or from which validator.

Figure 5:
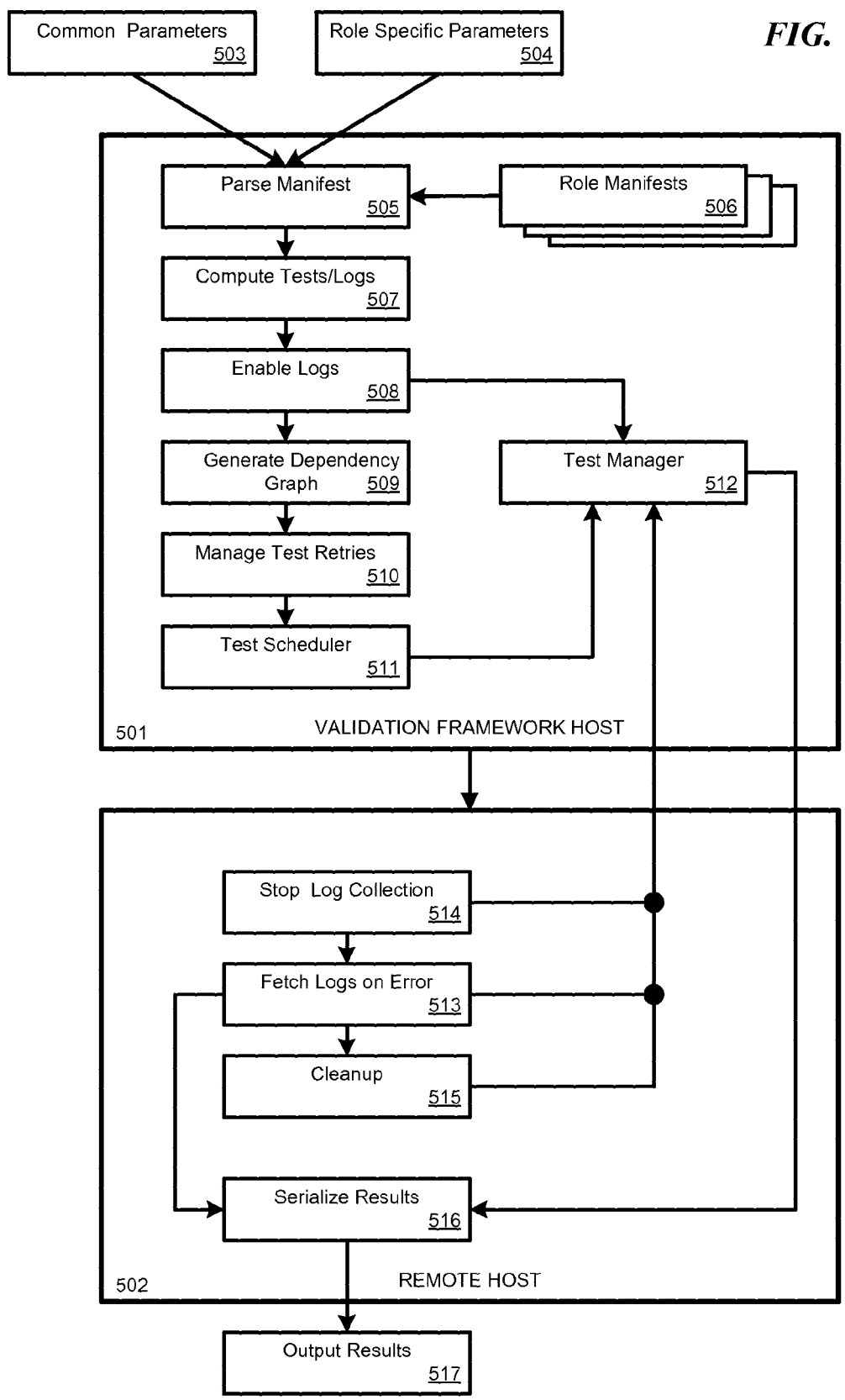
FIG. 5 illustrates the flow of control and the communication between layers in a cloud deployment infrastructure validation engine according to one embodiment.

FIG. 5 illustrates the flow of control and the communication between layers in a cloud deployment infrastructure validation engine according to one embodiment. The cloud deployment infrastructure validation engine is running on a management framework host 501 and validating services on a remote host 502. Validation framework host 501 and remote host 502 may be virtual machines on the same or different physical machines, for example. The flow begins by requesting the validation framework to validate a role on remote host 502. Although a single remote host 502 is illustrated in FIG. 5, it will be understood that any number of remote hosts may be validated in parallel.

The XML parser identifies the validators for the role and retrieves them from role manifests 506. The XML parser identifies the common parameters 503 and role-specific parameters 504 required for the manifest. Taking these inputs, the XML parser parses the manifest 505. The XML parser computes 507 the tests that need to be run and the logs that need to be enabled. The cmdlet layer calls into the execution layer and requests that it enable 508 the appropriate logs on the remote host 502.

Given the tests identified in the manifests, the test execution engine determines if there is any dependency among the tests and generates a dependency graph 509. The number of retries is also identified 510 from the role manifest. The validator information, dependency graph, and test retry information is provided to the test scheduler 511, which coordinates with the test manager 512 to execute the validator on remote host 502.

On remote host 502, the logs are enabled and errors are stored to the logs. When the test is complete, the test manager stops log collection 514 and invokes a cleanup 515. The manager fetches the logs 513 and the data from the logs is serialized 516. The data is then output as test results 517. The output may be collected by the test manager and/or stored to a repository. Additionally, text may be output to the operator, such as a description of a failure, steps to take to resolve the problem, or reference to external sources of information about the failure (e.g., websites, FAQs, etc.).

The examples of FIGS. 1-5 may be implemented on different nodes or machines. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

An exemplary system for implementing various aspects of the invention may include a general purpose computing device in the form of a computer. Components may include, but are not limited to, various hardware components, such as processing units, data storage, such as a system memory, and system bus that couples various system components including the data storage to the processing units. The system bus may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer typically includes a variety of computer-readable media. Computer-readable media may be any available media that can be accessed by the computer and includes both volatile and nonvolatile media, and removable and non-removable media, but excludes propagated signals. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory includes computer storage media in the form of volatile and/or nonvolatile memory such as read only memory (ROM) and random access memory (RAM). A basic input/output system (BIOS), containing the basic routines that help to transfer information between elements within computer, such as during start-up, is typically stored in ROM. RAM typically contains data and/or program modules that are immediately accessible to and/or presently being operated on by processing unit. By way of example, and not limitation, data storage holds an operating system, application programs, and other program modules and program data.

Data storage may also include other removable/non-removable, volatile/nonvolatile computer storage media. By way of example only, data storage may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 6, provide storage of computer-readable instructions, data structures, program modules and other data for the computer.

A user may enter commands and information through a user interface or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing units through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device is incorporated, such as in a tablet-type personal computer. In addition, computers such as the computing device may also include other peripheral output devices such as speakers and printer, which may be connected through an output peripheral interface or the like.

The computer may operate in a networked or cloud-computing environment using logical connections to one or more remote devices, such as a remote computer. The remote computer may be a personal computer, a server, a router, a network PC, a peer device or other common network node, and typically includes many or all of the elements described above relative to the computer. The logical connections depicted in FIG. 6 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer may be connected to a public or private network through a network interface or adapter. In some embodiments, a modem or other means for establishing communications over the network. The modem, which may be internal or external, may be connected to the system bus via a network interface or other appropriate mechanism. A wireless networking component such as comprising an interface and antenna may be coupled through a suitable device such as an access point or peer computer to a network. In a networked environment, program modules depicted relative to the computer, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At a computing device including one or more processors and system memory, a method for validating installed services on the computing device, the method comprising:
receiving a request for validation of an installed role;
retrieving a manifest for the installed role, wherein the manifest identifies a plurality of validators for the installed role;

identifying dependencies among two or more of the validators based upon common parameters and role-specific parameters required for the manifest;
generating a dependency graph based upon the determined dependencies;
executing the one or more validators in an order specified by the dependency graph;
retrieving a diagnoser associated with the installed role; and
executing the diagnoser to identify a source of an installed role failure.

2. The method of claim 1, further comprising:
identifying the source of the installed role failure;
retrieving a resolver associated with the diagnoser; and
executing the resolver.

3. The method of claim 2, further comprising:
executing the one or more operations specified in the validator manifest to determine if a failure was corrected by the resolver.

4. The method of claim 1, further comprising:
identifying the source of the installed role failure; and
providing a failure notification to an operator.

5. The method of claim 4, wherein the failure notification comprises operator instructions identifying potential corrections for the installed role failure.

6. The method of claim 1, further comprising:
identifying a number of retries for each of the validators.

7. The method of claim 1, further comprising:
establishing a runspace for execution of the one or more operations specified in the validator manifest.

8. The method of claim 1, further comprising:
identifying one or more logs specified in the validator manifest; and
collecting entries from the one or more logs after executing the one or more operations specified in the manifest.

9. A memory device having stored thereon computer-executable instructions that, when executed by a processor of a computing system, cause the computing system to:
receive a request for validation of a role installed on one or more hosts;
retrieve a manifest for the installed role, wherein the manifest identifies a plurality of validators for the installed role;
identify dependencies among two or more of the validators based upon common parameters and role-specific parameters required for the manifest;
generate a dependency graph based upon the determined dependencies;
execute the validators in an order specified by the dependency graph;
retrieve a diagnoser associated with the validator; and
execute the diagnoser to identify a source of an installed role failure.

10. The memory device of claim 9, wherein the computer-executable instructions, when executed by the processor, further cause the computing system to:
identify the source of the installed role failure;
retrieve a resolver associated with the diagnoser; and
execute the resolver.

11. The memory device of claim 10, wherein the computer-executable instructions, when executed by the processor, further cause the computing system to:
execute the validator after executing the resolver to determine if the installed role failure was corrected by the resolver.

12. The memory device of claim 9, wherein the computer-executable instructions, when executed by the processor, further cause the computing system to:
identify the source of the installed role failure; and
provide a failure notification to an operator.

13. The memory device of claim 12, wherein the failure notification comprises operator instructions identifying potential corrections for the installed role failure.

14. The memory device of claim 9, wherein the computer-executable instructions, when executed by the processor, further cause the computing system to:
identify a number of retries for each of the validators.

15. A computer system, comprising:
a processor; and
a memory coupled to the processor, the memory having stored thereon computer-executable instructions that, when executed by the processor, cause the computer system to provide:
a command interface configured to receive commands to invoke validation of installed roles;
an execution engine configured to: (a) retrieve a manifest for an installed role, wherein the manifest identifies a plurality of validators for the installed role, (b) identify dependencies among two or more of the validators based upon common parameters and role-specific parameters required for the manifest, and (c) generate a dependency graph based upon the determined dependencies;
a command executor configured to execute commands specified in the validators in an order specified by the dependency graph; and
a log aggregator configured to collect log data generated by execution of the commands specified in the validators.

16. The computer system of claim 15, wherein the computer-executable instructions further cause the computer system to provide:
a script repository configured to store manifests corresponding to a plurality of validators;
a manifest parser configured to extract validator test instructions from the manifests and to provide the instructions to the execution engine.

17. The computer system of claim 15, wherein the computer-executable instructions further cause the computer system to provide:
a runspace manager configured to provide a runspace for execution of validation tests.

18. The computer system of claim 17, wherein the runspace manager is further configured to provide communication between the command executor and a plurality of remote hosts.

19. The computer system of claim 15, wherein the computer-executable instructions further cause the computer system to provide:
a log manager configured to track which logs are to be collected for a particular validator and to determine which specific collectors is required to collect different types of logs.

20. The computer system of claim 15, wherein the computer-executable instructions further cause the computer system to provide:
a repository configured to retrieve and store results from validation tests;
a result serializer configured to save the validation test results in a designated format; and
a log location manager configured to provide addressing capability for storage and retrieval of serialized test results.

* * * * *